April 19, 1966 P. G. REBECHINI 3,247,408
BRUSH ASSEMBLY
Filed June 10, 1963
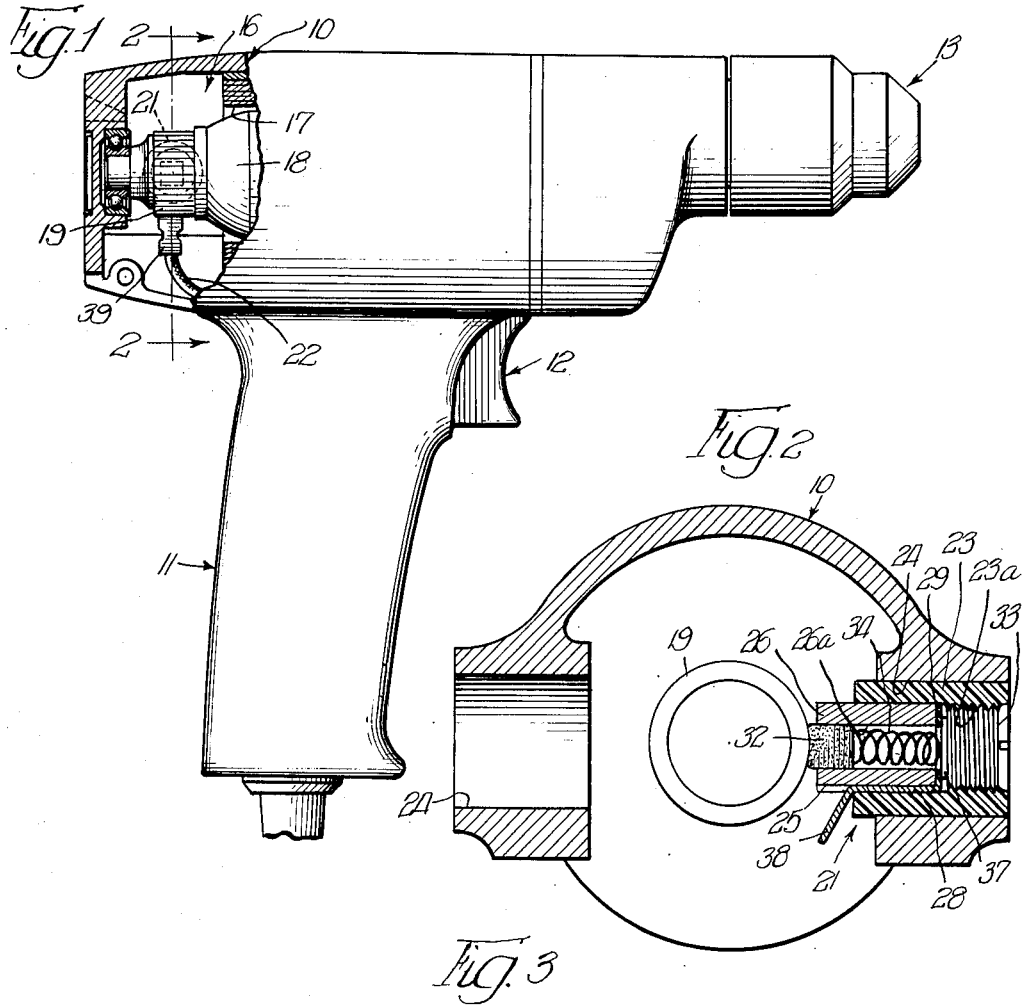
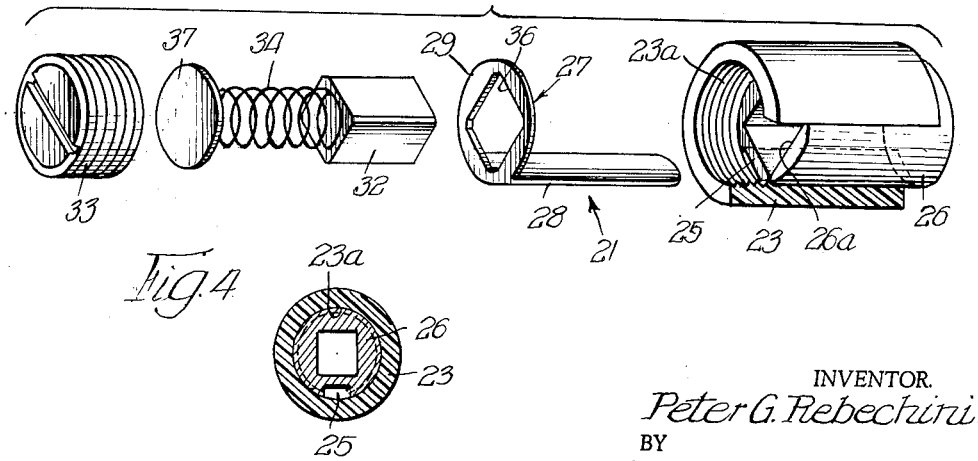
INVENTOR.
Peter G. Rebechini.
BY
Hibben, Noyes & Burkland

United States Patent Office 3,247,408
Patented Apr. 19, 1966

3,247,408
BRUSH ASSEMBLY
Peter G. Rebechini, Aurora, Ill., assignor to Thor Power Tool Company, Aurora, Ill., a corporation of Delaware
Filed June 10, 1963, Ser. No. 286,562
7 Claims. (Cl. 310—247)

This invention relates to electric motors, and more particularly to a brush assembly for an electric motor.

A portable power tool, for example, a hand drill, frequently has an electric motor of the universal type mounted within a housing of the tool. This type of motor, of course, requires a commutator and a brush assembly, and, in the past, one type of brush assembly which has been provided includes a tubular metallic brush holder for a brush. The holder has been connected to an external power circuit by forming a groove in the outer periphery of the brush holder and positioning a metal garter spring in this groove. A flexible wire is soldered to the garter spring and is connected to the external power circuit. In another construction, a metal band is clamped around the outer periphery of the brush holder and connected, as by soldering, to the external power circuit.

These constructions have the disadvantages that they are not as compact as desired and they are relatively difficult to assemble.

Accordingly, it is an object of this invention to provide an improved brush assembly for an electric motor which is relatively compact.

It is another object to provide a brush assembly of the foregoing character, which is relatively easy to assemble.

Still another object is to provide a brush assembly of the foregoing character, which makes possible a good electric connection with an external outer circuit.

It is still another object to provide a brush assembly of the foregoing character, which is particularly suited for use in a portable power tool.

Other objects and advantages of the invention will become apparent from the following description taken in conjunction with the accompanying figures of the drawing, in which:

FIG. 1 is a view partially in section of a portable power tool including a brush assembly embodying the invention;

FIG. 2 is an enlarged sectional view taken on the line 2—2 of FIG. 1;

FIG. 3 is an exploded view of the brush assembly; and

FIG. 4 is a sectional view of the right-hand portion of the exploded brush assembly shown in FIG. 3.

Briefly, a brush assembly embodying the invention is adapted to be mounted on the housing, for example, of an electric motor adjacent a commutator of the motor. The assembly includes an electrically conductive tubular brush holder which is positioned with one end adjacent the commutator and with its axis extending generally radially of the commutator. A tubular sleeve, preferably made of an insulating material, is positioned around the brush holder and secured to the housing of the motor. A brush is positioned within the opening of the tubular brush holder at the end of the brush holder adjacent the commutator, and biasing means is provided for urging the brush in the direction of the commutator. The assembly further includes an electrically conductive connector member having a longitudinal portion, which is positioned between the brush holder and the sleeve, and a lug portion which extends outwardly from the longitudinal portion and is adapted to be attached to a wire which leads to an external power circuit. The connector member further includes a lateral portion which is positioned over the end of the brush holder which is away from the commutator and is held tightly against this end of the brush holder. Further, a longitudinal slot is preferably formed in the outer periphery of the brush holder and the longitudinal portion of the connector member is positioned within this slot.

While the following description is directed to a portable power tool, it will be understood that a brush assembly embodying the invention may be used with motors having other applications.

In greater detail, FIG. 1 illustrates a portable tool including a housing 10, which may be made of metal, a handle 11 for holding the tool, a trigger or switch actuator 12 for energizing the tool, and a chuck 13 for holding a drill, for example. Mounted within the housing 10 is a motor 16 including a stator 17 and a rotatably mounted rotor 18. Adjacent one end of the rotor 18 is a commutator 19 and a brush assembly 21. A wire 22 is connected to the brush assembly 21 and extends to an external power circuit (not shown). While only one brush assembly is shown in FIG. 1, it will be understood that two identical brush assemblies are required, one on each side of the commutator 19.

One brush assembly 21 is illustrated in detail in FIGS. 2, 3, and 4, and comprises a tubular sleeve 23 having a bore 23a, which is preferably made of an electrical insulating material. The sleeve 23 is positioned within a hole 24 (FIG. 2) formed in the housing 10 adjacent the commutator 19. Both the outer periphery of the sleeve 23 and the hole 24 may have a circular configuration, and the sleeve 23 may be secured to the housing 10 as by a press fit or by gluing.

The brush assembly 21 further includes a tubular metallic brush holder 26 having a bore 26a, which is positioned within the bore 23a of the sleeve 23 with one end of the brush holder 26 adjacent the commutator 19 and its axis extending generally radially of the commutator 19. The outer periphery of the brush holder 26 and the bore 23a of the sleeve 23 are preferably circular, and the brush holder 26 may be secured within the bore 23a, as by a press fit or gluing.

To connect the assembly 21 to an external power circuit, the brush assembly 21 further includes a connector member 27 including a longitudinal portion 28 which is positioned between the brush holder 26 and the sleeve 23. To provide space for the portion 28, a lonigtudinally extending slot 25 is preferably formed in the outer periphery of the brush holder 26, which receives the longitudinal connector portion 28. The connector member 27 further includes a lateral portion 29 which is positioned over the end of the brush holder 26 which is remote from the commutator 19. The periphery of the lateral portion 29 is preferably circular and is sized to fit within the bore 23a of the sleeve 23 (FIG. 2).

A brush 32 is positioned within the bore 26a of the brush holder 26 at the end of the bore 26a adjacent the commutator 19, and biasing means is provided to urge the brush 32 toward the commutator 19. This biasing means comprises a plug member 33, preferably made of an insulating material in the form of a screw which is threaded into the outer end of the bore 23a, this end of the bore 23a having internal threads for this purpose. A compression spring 34 is positioned between the brush 32 and the plug member 33, and extends through an opening 36 formed through the lateral portion 29 of the connector member 27. A circular metallic cap 37 which is larger than the opening 36 of the lateral portion 29 may be positioned between the outer end of the spring 34 and the plug member 33 and over the outer surface of the portion 29. Thus, when the plug member 33 is threaded into the sleeve 23, the spring 34 is partially compressed and it holds the brush 32 against the commutator 19.

To secure the connector member 27 to an external power circuit, a lug portion 38 is also formed on the connector member 27 by bending the inner end of the longitudinal portion 28 outwardly (FIG. 2). Thus, the wire 22 shown in FIG. 1 may be attached to the lug portion 38 by a suitable fastener 39 (FIG. 1) which may be slipped over the lug portion 38.

As shown in FIG. 3, the brush 32 and the bore 26a of the brush holder 26 are preferably made having an out-of-round configuration in order to prevent the brush 32 from rotating relative to the brush holder 26. In the construction shown, this configuration is square. The opening 36 of the lateral portion 29 of the connector member 27 preferably has the same configuration as the brush 32 and the bore 26a, and the opening 36 is preferably made somewhat larger than the brush 32 so that the brush 32 may readily be passed through the opening 36. Of course, the position of the longitudinal portion 28 relative to the opening 36 must correspond to the relation of the slot 25 to the bore 26a so that the opening 36 will circumscribe the bore 26a when the parts are placed in assembled relation.

The parts may be placed in assembled relation as follows: The connector member 27 is positioned with the longitudinal portion 28 within the slot 25 of the brush holder 26, and the brush holder is secured to the sleeve 23. The sleeve 23 and the brush holder 26 are then positioned within the hole 24 and secured to the housing 10. The brush 32 and the spring 34 are dropped through the opening 36 of the connector member 27 and into the bore 26a of the brush holder 26, after which the cap 37 and the plug member 33 are assembled to the sleeve 23. Once the brush holder 26 has been secured to the sleeve 23, the inner end of the longitudinal portion 28 of the connector member 27 may be bent outwardly to form the lug portion 38.

The structure herein described is advantageous because of the ease with which it is assembled and its compact nature. Less labor is required to make an electrical connection between the brush 32 and an external power circuit because no screw or solder connections are required. Further, a good electrical connection is made between the connector member 27 and the brush holder 26 because the longitudinal portion 28 of the connector member 27 is within the slot 25 of the brush holder 26. There is therefore a large contact area, which is further increased by the lateral portion 29 of the connector member 27 which is pressed tightly against the outer surface of the brush holder 26.

I claim:

1. A brush assembly for an electric motor including a housing and a commutator, comprising an electrically conductive tubular brush holder, a tubular sleeve made of insulating material positioned around said brush holder and secured thereto, said sleeve being adapted to be secured to the motor housing with one end of said brush holder positioned adjacent said commutator, the bore of said tubular brush holder at said one end being adapted to receive a brush which is adapted to engage said commutator, biasing means adapted to engage the brush and urge the brush toward the commutator, and an electrically conductive connector member including a longitudinal portion positioned between said brush holder and said sleeve, a lateral portion which extends over the other end of said brush holder and a lug portion which extends outwardly from said longitudinal portion and is adapted to be connected to a wire, whereby an electrical connection is adapted to be made from the wire to the commutator through said connector member, said brush holder, and said brush.

2. A brush assembly for an electric motor including a housing and a commutator, comprising an electrically conductive tubular brush holder, a tubular sleeve made of insulating material positioned around said brush holder and secured thereto, said sleeve being adapted to be secured to the motor housing with one end of said brush holder positioned adjacent said commutator, a brush positioned within the bore of said tubular brush holder at said one end and adapted to engage said commutator, biasing means for urging said brush toward said commutator, and an electrically conductive connector member including a longitudinal portion positioned between said brush holder and said sleeve, and a lug portion which extends outwardly from said longitudinal portion and is adapted to be connected to a wire, whereby an electrical connection is adapted to be made from the wire to the commutator through said connector member, said brush holder, and said brush, a longitudinally extending slot being formed in the outer periphery of said brush holder, and said longitudinal portion of said connector member being positioned within said slot.

3. A brush assembly for an electric motor including a housing and a commutator, comprising an electrically conductive tubular brush holder, a tubular sleeve made of insulating material positioned around said brush holder and secured thereto, said sleeve being adapted to be secured to the motor housing with one end of said brush holder positioned adjacent said commutator, a brush positioned within the bore of said tubular brush holder at said one end and adapted to engage said commutator, biasing means for urging said brush toward said commutator, and an electrically conductive connector member including a longitudinal portion positioned between said brush holder and said sleeve, and a lug portion which extends outwardly from said longitudinal portion and is adapted to be connected to a wire, whereby an electrical connection is adapted to be made from the wire to the commutator through said connector member, said brush holder, and said brush, said connector member further including a lateral portion which extends over the other end of said brush holder, said lateral portion of said connector member having an opening formed therethrough, and said biasing means comprising a plug member secured to said sleeve and positioned over said other end of said brush holder, and a compression spring positioned between said brush and said plug member, said spring extending through said opening in said lateral portion of said connector member.

4. A brush assembly as in claim 3, wherein said opening in said lateral portion is sufficiently large that said brush may be passed therethrough.

5. A brush assembly as in claim 4, wherein said opening of said connector member, said opening of said tubular brush holder, and said brush all have a similar out-of-round configuration, which prevents said brush from rotating relative to said brush holder.

6. A portable power tool comprising a housing, an electric motor mounted within said housing, said motor including a commutator and a brush assembly, said brush assembly including a sleeve secured to said housing adjacent said commutator, a metallic tubular brush holder secured within said sleeve and having one end which extends to a location closely adjacent said commutator, a brush positioned within said tubular brush holder at said one end and adapted to engage said commutator, biasing means fastened to said sleeve for urging said brush toward said commutator, and a metallic connector member including a first portion extending between said sleeve and said brush holder and adapted to be connected to an external power circuit, and a second portion which extends over the end of the brush holder which is remote from said commutator, said biasing means holding said second portion against said brush holder.

7. A portable power tool comprising a housing, an electric motor mounted within said housing, said motor including a commutator and a brush assembly, said brush assembly including a sleeve secured to said housing adjacent said commutator, a metallic tubular brush holder secured within said sleeve and having one end which extends to a location closely adjacent said commutator, a brush positioned within said tubular brush holder at said one end and adapted to engage said commutator, biasing means fastened to said sleeve for urging said brush toward said commutator, and a metallic connector member including a first portion extending between said sleeve and said brush holder and adapted to be connected to an external power circuit, a longitudinal slot being formed in the outer periphery of said brush holder and said first portion of said connector member being positioned in said slot.

References Cited by the Examiner
UNITED STATES PATENTS 2,303,836   12/1942   Gordon _____ 310—247

ORIS L. RADER, *Primary Examiner.*

MILTON O. HIRSHFIELD, *Examiner.*